Dec. 2, 1952     M. N. RAINIER     2,619,916
CONVEYER

Filed March 10, 1947     3 Sheets-Sheet 1

INVENTOR
MAURICE N. RAINIER
BY *Mason & Graham*
ATTORNEYS

Dec. 2, 1952 M. N. RAINIER 2,619,916
CONVEYER
Filed March 10, 1947 3 Sheets-Sheet 2
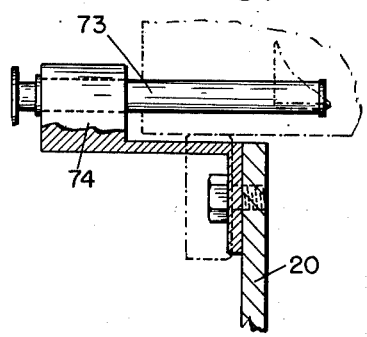
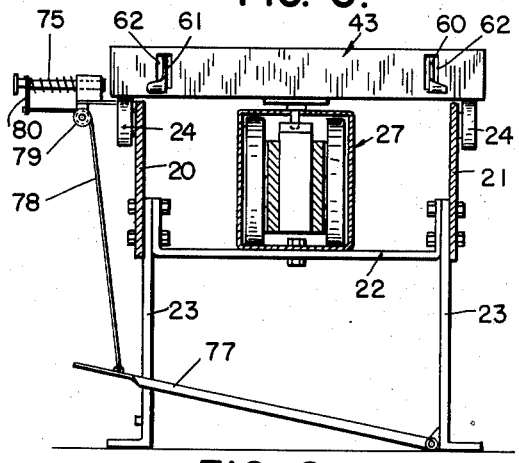
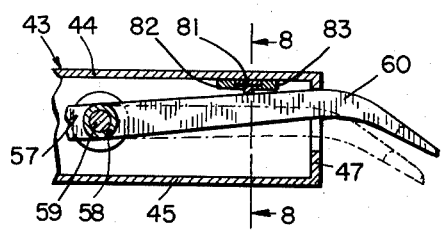
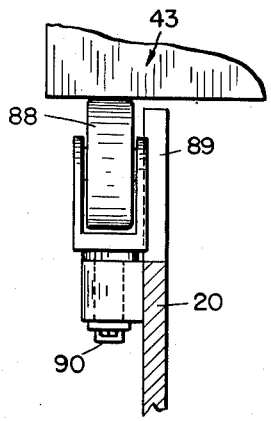
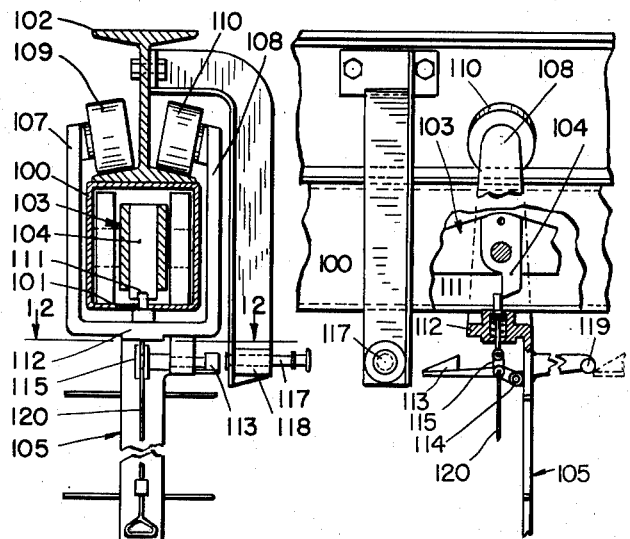
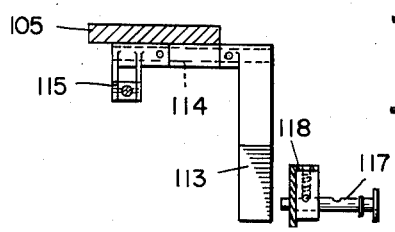
INVENTOR
MAURICE N. RAINIER
BY
ATTORNEYS Dec. 2, 1952     M. N. RAINIER     2,619,916
CONVEYER Filed March 10, 1947     3 Sheets-Sheet 3

INVENTOR
MAURICE N. RAINIER
BY
ATTORNEYS

Patented Dec. 2, 1952

2,619,916

UNITED STATES PATENT OFFICE 2,619,916

CONVEYER

Maurice N. Rainier, Los Angeles, Calif.

Application March 10, 1947, Serial No. 733,513

8 Claims. (Cl. 104—172)

The present invention relates to a conveyor, and more particularly to a conveyor of a type used on production lines, and to support work pieces for the performance of work operations thereon.

In manufacturing and other installations where articles are assembled or processed while traveling on conveyors, as in the so-called production line method of manufacturing, it is desirable that the drive mechanism for the conveyor run continuously at a speed which ordinarily is determined by the slowest operation to be performed. Where the articles or work pieces being processed on the conveyor are delayed at any of the work stations along the production line, it is customary either to: (a) remove the items on which the work is delayed from the conveyor, and to finish them by hand; (b) permit the articles to go on through the production line and perform as many of the remaining operations thereon as is possible, and then finish them by hand; or (c) stop the conveyor and wait until the cause of the interruption has been removed and thus delay production all along the line. Any of these three procedures is costly, and when repeated frequently enough, affect substantially the cost of the finished product. The causes of such interruptions and stoppages are numerous and include the momentary lack of a part or tool to perform a necessary operation, the necessity for performing an operation over in case of sticking or breaking of a part or tool, absenteeism which requires a slowing down of an operation, and the necessity of an employee to leave his station temporarily for personal reasons.

An object of the present invention is to make an improved and simplified conveyor for use in manufacturing and processing operations.

Another object is to make an improved station stop for a conveyor.

Another object is to make a conveyor having a work support connected to a driving element so as to be readily engageable by and disengageable from the driving element.

Another object is to make a conveyor with maximum flexibility of handling of work supports thereon.

Another object is to carry a traveling work support on a conveyor with means for releasably engaging the work support and a power driven conveying element at a desired point on the conveyor, the engaging means being flexible in operation for predetermined releasing arrangement along the route of the conveyor.

Another object is to make a conveyor having a traveling work support mounted adjacent a power driven conveying element, with means for releasably engaging the work support and the conveying element, and release means operable to release engagement of the work support with the conveying element upon the overtaking by a succeeding work support of a preceding one on the conveyor.

Another object is to make a conveyor wherein a work support carried by the conveyor can be advanced manually relatively to a conveyor drive element to a desired point on the conveyor.

Another object is to make a conveyor wherein a plurality of spaced work supports having driven connection with a conveyor drive element can be compacted into laterally juxtaposed condition and advanced at a different rate from the speed of the conveyor drive mechanism.

Another object is to make a conveyor having means for driving work supports at normal spaced intervals at a predetermined speed throughout a portion of its length, with means to turn the work supports and means for moving them into compacted, closely juxtaposed, positions relatively to each other, the conveyor having means again to attain normal driving relationship with the work supports, at the same time moving them to their original normal intervals.

These and other objects of the invention will be more fully set forth in the following description and the accompanying drawings, of which there are three sheets. In the drawings:

Fig. 5 is an enlarged fragmentary sectional view taken on the line 5—5 of Fig. 3;

Fig. 6 is a sectional view similar to Fig. 1, showing a mounting of a station stop;

Fig. 7 is an enlarged sectional view through the marginal portion of a work supporting pallet, having a latch releasing cam slidably mounted thereon;

Fig. 8 is sectional view taken on the line 8—8 of Fig. 7;

Fig. 9 is an enlarged fragmentary sectional view of a work supporting roller which is castored to permit rotating a work piece supported thereon;

Fig. 10 is a vertical transverse sectional view through an overhead type conveyor and work support embodying a modification of the present invention;

Fig. 11 is a side elevational view of the structure of Fig. 10;

Fig. 12 is a sectional view taken on the line 12—12 of Fig. 10;

Figure 1:
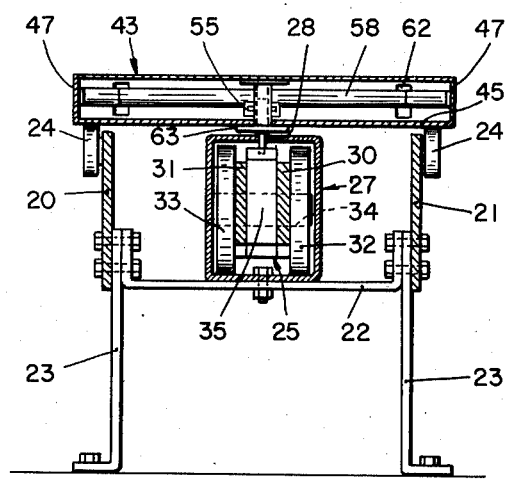
Fig. 1 is a transverse sectional view of a roller and pallet type conveyor with a central power driven conveying chain.
Figure 4:
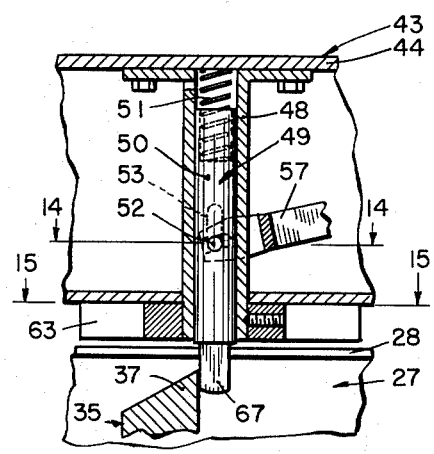
Fig. 4 is an enlarged fragmentary sectional view taken on the line 4—4 of Fig. 3.
Figure 2:
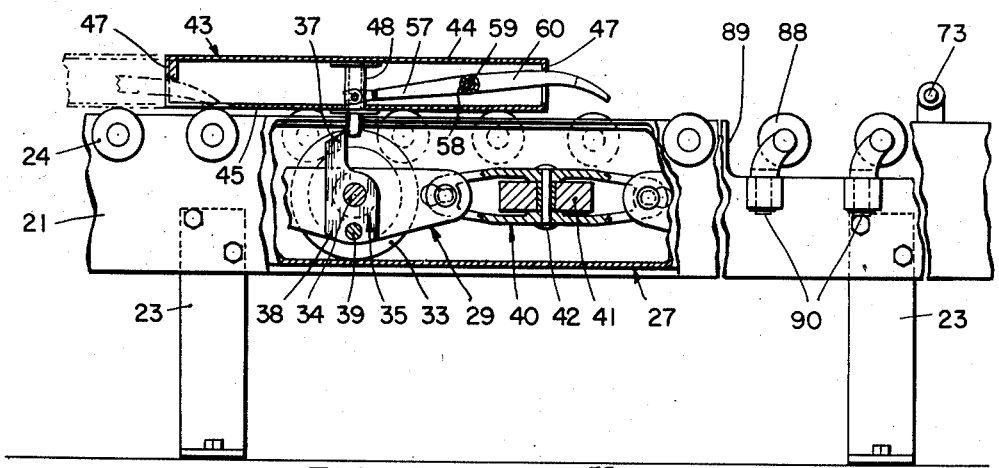
Fig. 2 is a side elevational view of the structure shown in Fig. 1, a side portion of a conveyor frame being broken away to show the internal construction, and a work supporting pallet being shown in section.
Figure 3:
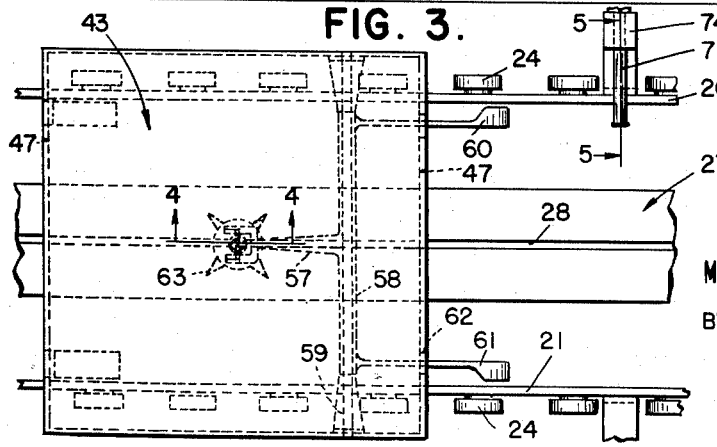
Fig. 3 is a plan view of the mechanism illustrated in Figs. 1 and 2.

Referring to the drawings in detail, a conveyor illustrated in Figs. 1, 2 and 3 has side plates 20 and 21, and transverse frame members 22 and legs 23. A plurality of work support wheels or rollers 24 are pivotally mounted at relatively close intervals along the upper edges of both of the side plates 20 and 21. The rollers are mounted to project slightly above the upper edges of the side plates. The legs 23 may be of suitable structural steel, as may the transverse frame members 22 which are mounted preferably one at each leg station.

The driving run 25 of a conveyor drive chain or propelling element is mounted to extend throughout the length of the conveyor, and has the usual driving mechanism, not shown. Preferably, for purposes of support and protection, the chain is mounted with its driving run enclosed in a box-like enclosure 27, with a slotted opening 28 throughout the entire length of its upper side. This slotted opening 28 provides access for driving engagement between the drive chain and work supports carried by the conveyor.

The drive chain, as illustrated, has elongated main links 29, and a pair of link side plates 30 and 31, (see Figs. 1 and 2). Two rollers 32 and 33 are pivoted on the laterally projecting ends of a short shaft 34 which is mounted in holes in the two side plates of the link. A work support drive pawl 35 is mounted on the shaft 34 between the side plates of the link and has an upwardly extending latch engaging nose portion 37 and a downwardly extending portion 38.

The downwardly extending portion 38 has a hole therein in which an anchoring pin 39 is inserted. This pin may be of relatively soft material, such as brass, to act as a shear pin in case of extreme stress. The shear pin also extends into holes drilled in the side plates of the link. The shear pin 39 normally holds the pawl 35 in vertical position, as illustrated in Fig. 2. However, in case of mal-function or jamming of a pallet, the pin would shear off and permit the pawl to rotate to release its driving engagement with the work support, thereby preventing damage to other parts of the equipment.

Intermediate links 40 connect alternate pawl supporting links 29. Each intermediate link has a roller 41 pivoted on a short shaft 42 to rotate in a plane normal to that of the rollers 32. The rollers 41 have rolling engagement with the sides of the chain enclosure 27.

A plurality of work supports, here illustrated as pallets 43, are shown as of hollow rectangular construction. Each pallet has a top plate 44, a bottom plate 45, and side and end walls 47. The pallets are adapted to roll on the rollers 24 on the sides of the conveyor frame.

To permit rotating the pallet at desired points along the conveyor, a plurality of castored rollers 88 may be substituted for the fixed axis rollers 24 at desired intervals along the conveyor, preferably at one of the regular stop stations. These castored rollers are mounted in notches 89 in the conveyor frame side members 20 and 21 so as to be free to pivot about a vertical pivot 90 (see Fig. 9). This permits a pallet supported on these castored rollers to be rotated where it is desired to perform operations on a work piece supported on the pallet which may require such manipulation. An example of such an operation would be painting of the work piece.

A tubular latch guide member 48 is secured centrally to the under surface of the top plate 44 and projects downwardly through a central opening in the bottom plate 45.

A sliding latch member 49 is mounted telescopically in the tube 48, the latch member 49 having a cylindrical upper portion 50 which is mounted telescopically within the tubular latch support 48. A coil spring 51 is inserted between the top plate 44 and the upper end of the latch member 49, normally to urge the latch member downwardly. The lower end of the latch member preferably is rounded so as to facilitate its camming over a chain drive pawl 35 when the pallet on which the latch member is mounted is shoved ahead on the conveyor at a speed greater than that of the drive chain.

A latch operating pin 52 is mounted in a hole drilled transversely through an intermediate portion of the latch member, the pin riding vertically in slots 53 in the wall of the tubular latch guide member 48. The ends of the latch operating pin project laterally beyond the tubular latch support and are received in slotted grooves 54 on the inner faces of the bifurcated ends 55 of a latch release lever 57.

The latch release lever 57 is secured to a transversely extending hub portion 58, which is pivoted on a rod 59. The rod 59 is mounted transversely of the pallet, see Figs. 2 and 3. A pair of forwardly extending lever operating arms 60 and 61 are secured to the hub 58 to project through vertically slotted openings 62 in what is normally the forward end wall of the pallet. The slotted openings 62 are of sufficient length to permit full operative movement of the latch member upon depressing the arms 60 and 61.

The forward end of each of the arms 60 and 61 is curved downwardly to form a cam, and the rear end of each pallet is adapted to be engaged by these down curved ends of the arms of a pallet when moved into engagement therewith. This action exerts a downward camming action on the arms 60 and 61 of the rear pallet to raise its associated latch member to its upper limit of movement, thereby to release it from driven engagement by a chain pawl 35. With this arrangement, providing the pallets are arranged on the conveyor with their arms 60 and 61 projecting from the forward ends of the pallets, when a pallet is stopped at any point on the conveyor, each succeeding rearward pallet will be released from driving engagement with the chain as its arms 60 and 61 are cammed downwardly by engagement with the next preceding pallet.

When a plurality of pallets thus are stopped, and the latch on the leading pallet in the group is dropped into chain engaging position, each leading pallet of the remaining group will be picked up, one by one, by successive pawls 35 on the chain. If desired, and there are vacancies in the pawls ahead of any pallet, the pallet may be shoved ahead on the conveyor as far as desired, the latch, as previously explained, camming over each pawl as it passes.

A four pointed star wheel cam 63 is secured to the lower end of each tubular latch guide 48 so that the star wheel is positioned beneath the pallet bottom plate 45. This star wheel cam provides means for turning the pallet back and forth through an angle of 90° at desired points along the conveyor.

Figure 13:
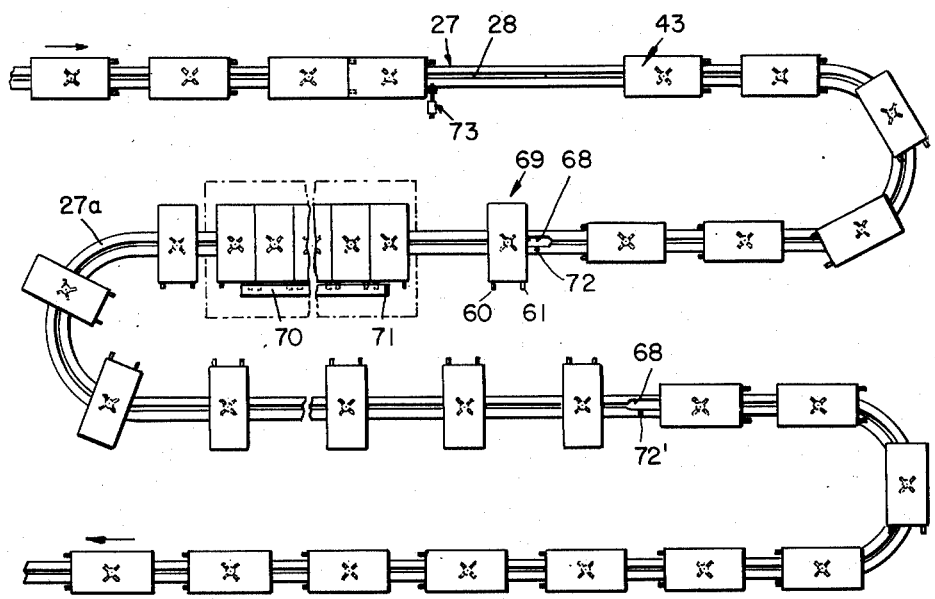
Fig. 13 is a diagrammatic plan view of a pallet carrying conveyor of the general type illustrated in Figs. 1 to 9 inclusive, showing various features of operation of the invention.
Figure 14:
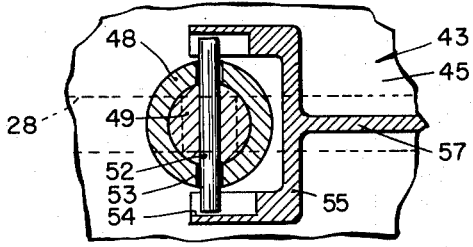
Fig. 14 is an enlarged fragmentary sectional view through a latch member taken on the line 14—14 of Fig. 4.

The lower end of the latch pin is rectangular in cross section, as at 67, and is of a size to have a fairly close sliding fit between the sides of the slotted top opening 28 in the chain enclosure 27. The vertical movement of the latch member is limited so as to avoid withdrawing this rectangular lower end portion 67 from the slot 28, and thus prevents rotation of the pallet except at required stations throughout the length of the conveyor. At such points the slot 28 is widened to permit such rotation, as at 68 (Fig. 13).

In order to conserve space on the conveyor, for example, in a hot room or other processing area along the route of the conveyor, I provide an arrangement for turning the pallets to an angle of 90° from their normal position on the conveyor, moving them into closely juxtaposed relation to each other, and slowing down their rate of travel. Since normally the pallets are arranged with their longer axes parallel to the direction of movement of the conveyor, and are spaced apart, each pallet occupies a relatively large space on the conveyor and, of course, advances at the speed of the conveyor drive chain. This arrangement facilitates the performing of the work operations on the work pieces supported on the work supports or pallets with a minimum of reaching by the operators.

Figure 15:
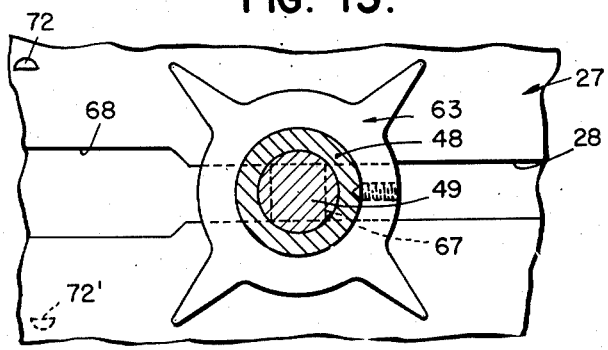
Fig. 15 is a similarly enlarged sectional view taken on the line 15—15 of Fig. 4 and showing a star wheel cam used for turning the pallet.
Figure 16:
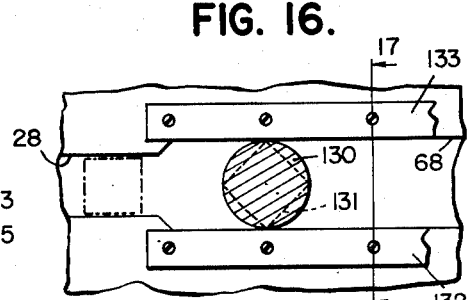
Fig. 16 is a fragmentary sectional view, on the same scale as Fig. 15, taken through the lower portion of a modified form of latch member just below a star shaped cam mounted thereon.

At a point slightly in advance of the area where the compacting and slowing down of the pallets is to be accomplished, a fixed actuating pin 72 (see Figs. 13 and 15) is mounted in position to engage a projecting point of the star wheel cam 63. As the pallet is moved forward by the conveyor chain, this stationary pin 72 rotates the star wheel cam, and the pallet with it, through an angle slightly greater than 90°. Turning of the pallet and its associated parts would be prevented by the engagement of the squared lower end of the latch member 49, except for the fact that the slot 28 is widened opposite the pin 72 to permit such turning. As the squared lower end of the latch member re-enters the normal width slot 28 beyond the turning station it adjusts the pallet to its 90° position. This action brings the pallet to the position 69 indicated in Fig. 13 with the arms 60 and 61 extending laterally from the line of travel of the conveyor.

A depresser bar 70 (see Fig. 13) is fixedly mounted at one side of the conveyor and has an upturned leading end portion 71 which acts as a cam to depress the laterally projecting latch release arms 60 and 61 as they pass beneath the depresser bar. This action raises the latch members 49 from engagement with the conveyor chain as each succeeding pallet is moved into position beneath the depresser bar 70. Each pallet, as it is moved to bring its arms 60 or 61 beneath the depresser bar, thus will force all of the pallets whose levers are beneath the depresser bar ahead until the arms 60 and 61 of this last driven pallet in turn are depressed by the depresser bar 70. Thus, as each new pallet pushes the group ahead, it will cause the release of the arms 60 and 61 of the last pallet in the group from beneath the depresser bar. When this occurs, the latch member of the last pallet will move down into chain engaging position and will be engaged by the next adjacent pawl on the drive chain.

Since the rate of advance of the pallets in this juxtaposed group is considerably less than that of the drive chain, the pallets again will assume their normal intervals of separation when released from this group, and are picked up, one by one, by the drive chain pawls. This action, namely, the restoration of normal intervals when released, permits curving the conveyor as at 27a (Fig. 13) beyond the depresser bar. If desired, the pallets again could be compacted in the same manner as described above as soon as they had rounded the turn in the conveyor by providing a similar depresser bar at a desired location. Such action might be desirable, if it were necessary to extend the processing time, by installing the conveyor in a U-shaped or serpentine pattern through the processing area.

When it is desired again to turn the pallets to their normal position relatively to the conveyor, they can be rotated through an angle of 90° in the opposite direction by an actuating pin 72' positioned on the opposite side of the slot 28 in the chain enclosure from the first actuating pin 72. This will return the pallets to their normal position with their releasing arms 60, 61 again in the desired forwardly extending position. It will, of course be necessary to widen the slot 28 and provide castored support rollers or other suitable means at all points where such turning of the pallets is accomplished.

The arms 60 and 61 of the latch release lever preferably are mounted just inwardly of the pallet side plates 47. A plurality of stop pins 73 are provided at predetermined stages along the route of the conveyor and on either side thereof, as desired, so that the pallets may be stopped automatically at these stations by moving the stop pins out into the paths of the arms 60 and 61.

The stop pins are mounted slidably in brackets 74 secured to the side of the conveyor. In their normal positions the stop pins 73 are moved outwardly away from the center line of the conveyor so as to clear the pallets as they pass by. The stop pins may be moved manually to their operated position, as shown in Fig. 3, when desired. Coil springs 75 may be mounted normally to hold the stop pins at a desired limit of movement.

A foot pedal 77 may be connected to operate the stop pin, by means of a flexible cable 78 running over a pulley 79 pivoted on the bracket 74. The cable is connected at its upper end to an arm 80 secured to the stop pin.

In order to permit holding the pallet free from driven engagement with the conveyor drive chain at any desired point on the conveyor, a sliding cam 81 (see Figs. 7 and 8) may be mounted beneath the top plate of each pallet. The cam 81 is slidably mounted in undercut guides 82 and 83 secured to the lower or inner side of the pallet top plate 44. A handle portion 84 projects outwardly through a slot in the side of the pallet, and has a bent outer end portion by means of which the cam member may be operated. A stop lug 85 extends downwardly from the body of the cam member and is adapted to engage the side wall of the pallet when the cam is at its outer limit of movement. The cam member has a sloping cam face 87 on its lower side. When the cam member is at its outward limit of movement, as shown in Fig. 8, the latch release lever 60 is permitted to assume its normal position. When the cam member is moved slidably inwardly, however, the lever 60 is depressed to the dotted line position shown in Fig. 7 to release the latch 49 from the drive chain.

Figure 17:
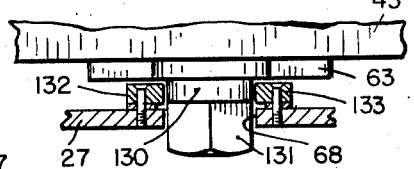
Fig. 17 is a sectional view taken on line 17—17 of Fig. 16.

In certain instances, for example, when the conveyor is to be used for supporting articles of furniture for assembly and subsequent painting, it is desirable to have the work support or pallet free for turning movement by an operator during the portion of conveyor travel where such operations are to be performed. For example, during the spraying of a piece of furniture mounted on the pallet, an operator usually is stationed on a platform mounted at the height of the pallet and at one side of the conveyor. It is desirable to permit the operator to turn the pallet and the item of furniture supported thereon by turning the pallet with his feet. In order to facilitate this turning of the pallet the space between the bottom of the pallet and the top of the conveyor chain housing 27 may be increased somewhat, as shown in Fig. 17. A rounded portion 130 of the latch may be exposed between a squared lower end portion 131 of the latch and a star shaped cam 63 which may be the same as that illustrated and described previously herein. A pair of secondary guide strips 132 and 133 are mounted on the upper surfaces of the side portions of the chain enclosure 27, and are spaced apart a distance to provide a working clearance between them to receive and guide the rounded portion 130 of the latch exposed below the star cam 63. This rounded surface holds the latch member and its associated pallet centered in the guideway throughout the portion of the conveyor where the guiding edges of the slot 28 are separated to free the square lower end portion of the latch for turning. The inner edges of the secondary guide strips 132 and 133 thus provide a bearing surface for the rounded portion 130 of the latch member which will permit the pallet to be turned freely by an operator, as above described.

It is not necessary for the operator to turn the pallet to an exact position on the conveyor after completing the operation requiring such turning, since, if the pallet is in other than properly squared position, the star cam will be turned to the desired position by the pin 72 positioned at the end of the widened portion of the main guide slot in time to guide the squared lower end of the latch into the narrow ensuing portion of the slot 28.

The invention also may be applied to an overhead conveyor, as shown in Figs. 10, 11 and 12. In this modification a chain support may be in the form of a housing 100 having a slotted opening 101 throughout the length of its lower side. The chain support 100 may be secured to an overhead I beam 102 which in turn may be supported from an overhead supporting structure in a usual manner.

A drive chain 103, which may be similar to the drive chain 25 illustrated in Figs. 1 and 2, is mounted in the housing 100, the drive pawls 104 in this case being directed downwardly instead of upwardly, as in Figs. 1 and 2. A work support 105 has a pair of bifurcated suspension arms 107 and 108 extending up along the sides of the housing 100, and each of said arms has a supporting roller 109 and 110 pivotally mounted on the upper end thereof. The rollers ride on the top surfaces of the bottom flanges of the I beam.

A spring pressed latch member 111 is mounted slidably in a bracket 112 secured to the work support, and a cam lever 113, which is pivotally mounted as at 114 on the work support, is connected as by means of a link 115 to the latch. Stop pins 117 may be provided at desired locations along the conveyor. Each stop pin is slidably mounted in a bracket 118 which is bolted to the web of the I beam.

By slidably moving a stop pin 117 inwardly to engage the cam shaped forward end of the lever 113, the latch 111 will be drawn downwardly to clear the pawl 104 and thereby free the work support from driven engagement with the drive chain. A lanyard 120 may be secured to the cam lever 113 so that an operator may free the work support from driven engagement with the chain at any desired point along the conveyor merely by drawing down on the lanyard to free the latch from the pawl.

A forwardly extending arm 119 of suitable length is mounted on each of the brackets 112, the forward end of each such arm being curved upwardly so as to engage and depress the cam lever 113 of the unit ahead of it when such unit ahead is stopped.

While I have illustrated and described a preferred embodiment of my invention, and some modifications thereof, it will be understood by those familiar with the art that the invention is capable of other modifications and it is desired, therefore, not to limit the invention except as defined in the following claims.

I claim:

1. A work supporting conveyor comprising a roller mounted conveyor track, a propelling element having a drive member mounted for lengthwise movement relatively thereto, a work support adapted to be mounted for rolling supported movement on said track, releasable latch means mounted on said work support for drive engagement between said work support and said drive member, in the direction of movement of said drive member, and cam means on said drive member to free said latch for passing said drive member when the work support is advanced along said track in the direction of movement of said drive member and at a speed in excess of the speed of said drive member.

2. A work supporting conveyor comprising a conveyor track, a propelling chain mounted for lengthwise movement relatively thereto in one direction along said track, a plurality of cam pawls mounted at spaced intervals on said chain to move therewith, a plurality of work supports adapted to be mounted for movement on said track, spring pressed latch means mounted on each work support and having a lower end portion positioned for driven engagement by said cam pawls, and latch operating means mounted to operate said latch to free it from such driven engagement, said latch being cammed into position by said cam pawls to pass said cam pawls on moving said work support along said track in the direction of chain movement and at a speed in excess thereof.

3. A work supporting conveyor comprising an elongated supporting frame, a driven propelling element having spaced drive members movable lengthwise of said conveyor frame, work supports adapted to be connected for driving to said drive members at the speed of said propelling element throughout a portion of the length of said conveyor, said work supports being adapted for turning about a vertical axis relatively to said frame at predetermined points along said frame, turning means positioned adjacent a turning point to turn said work supports relatively to said frame, release means for disconnecting said work supports from said drive members mounted on an end of each work support and adapted to extend laterally therefrom when so turned, and means mounted on said frame to engage said release means during a predetermined portion of the travel of said work supports along said frame when so turned to release said work supports from said drive members.

4. A work supporting conveyor comprising a supporting frame providing an elongated guide slot, an elongated driven propelling element mounted for movement lengthwise of said slot and adjacent thereto, said propelling element having drive members spaced therealong, a work support member adapted for movement relative to said frame, said work support member having a releasable latch including a pin projecting through said slot for connecting the work support member to a drive member, and interengaging means on said latch member and said frame in the region of the slot for maintaining the work support member oriented in a given direction with reference to said slot, the portion of said interengaging means on said frame extending for less than the length of said slot, leaving a given length of said frame along said slot without said interengaging means, whereby to permit said work support to be turned relative to said slot about the axis of the pin of said latch in said given length of said slot.

5. A work supporting conveyor comprising a supporting frame providing an elongated guide slot, an elongated driven propelling element mounted for movement lengthwise of said slot and adjacent thereto, said propelling element having drive members spaced therealong, a work support member adapted for movement relative to said frame, said work support member having a releasable latch including a pin projecting through said slot for connecting the work support member to a drive member, interengaging means on said latch member and said frame in the region of the slot for maintaining the work support member oriented in a given direction with reference to said slot, the portion of said interengaging means on said frame extending for less than the length of said slot, leaving a given length of said frame along said slot without said interengaging means, whereby to permit said work support to be turned relative to said slot about the axis of the pin of said latch in said given length of said slot, and a work support turning member on said frame in the region of said given length of said slot and in the path of a work support for turning said work support as the same passes the turning member.

6. A work supporting conveyor comprising a supporting frame providing an elongated guide slot, an elongated driven propelling element mounted for movement lengthwise of said slot and adjacent thereto, said propelling element having drive members spaced therealong, a work support member adapted for movement relative to said frame, said work support member having a releasable latch including a pin projecting through said slot for connecting the work support member to a drive member, interengaging means on said latch member and said frame in the region of the slot for maintaining the work support member oriented in a given direction with reference to said slot, the portion of said interengaging means on said frame extending for less than the length of said slot, leaving a given length of said frame along said slot without said interengaging means, whereby to permit said work support to be turned relative to said slot about the axis of the pin of said latch in said given length of said slot, and a work support turning member on said frame in the region of said given length of said slot and in the path of a work support for turning said work support as the same passes the turning member and means on said frame in the region of said given length of said slot for releasing said latch from a drive member when the work support is turned.

7. A work support adapted to be conveyed along a conveyor means including a conveyor frame providing a slot and an elongated propelling member movable along the frame on the side of the slot opposite that on which the work support is positioned, said support comprising a pallet-like body, a latch means depending from said body and including a spring biased pin mounted for axial movement and normally urged downwardly and adapted to extend through the slot in the conveyor frame for engagement with said propelling member, a latch means release lever pivotally mounted intermediate its ends on said body and having its outer end extending beyond said body, the inner end of said lever being operatively connected to said pin whereby pivotal movement of said lever serves to raise said pin to release the same from said propelling member.

8. A work support as defined in claim 7 in which said pin is flat sided in the region where it extends through said slot and in which said pin is mounted on the body to prevent relative rotation of the pin and body.

MAURICE N. RAINIER.

REFERENCES CITED

The following references are of record in the file of this patent:

UNITED STATES PATENTS

| Number | Name | Date |
|---|---|---|
| 401,352 | Hosea | Apr. 16, 1889 |
| 555,081 | Edmond | Feb. 25, 1896 |
| 1,000,106 | Morris | Aug. 8, 1911 |
| 1,000,107 | Morris | Aug. 8, 1911 |
| 1,104,481 | Dodds et al. | July 21, 1914 |
| 1,124,267 | Bernheim | Jan. 12, 1915 |
| 1,256,474 | Grabowski | Feb. 12, 1918 |
| 1,420,115 | Lange | June 20, 1922 |
| 1,556,819 | Hires | Oct. 13, 1925 |
| 1,635,341 | Romine | July 5, 1927 |
| 1,725,653 | Kruckenberg | Aug. 20, 1929 |
| 1,799,161 | Fugle et al. | Apr. 7, 1931 |
| 1,869,794 | Bell | Aug. 2, 1932 |
| 1,921,109 | Webb et al. | Aug. 8, 1933 |
| 2,040,353 | Wilson | May 12, 1936 |
| 2,128,492 | Mena | Aug. 30, 1938 |
| 2,234,620 | Botley | Mar. 11, 1941 |
| 2,485,215 | Rose | Oct. 18, 1949 |